US007340285B2

(12) United States Patent
Yoshino

(10) Patent No.: US 7,340,285 B2
(45) Date of Patent: Mar. 4, 2008

(54) EARPHONE ANTENNA AND PORTABLE RADIO EQUIPMENT PROVIDED WITH EARPHONE ANTENNA

(75) Inventor: Yoshitaka Yoshino, Tokyo (JP)

(73) Assignee: Sony Corporation (JP)

( * ) Notice: Subject to any disclaimer, the term of this patent is extended or adjusted under 35 U.S.C. 154(b) by 477 days.

(21) Appl. No.: 11/108,964

(22) Filed: Apr. 19, 2005

(65) Prior Publication Data

US 2005/0245289 A1 Nov. 3, 2005

(30) Foreign Application Priority Data

Apr. 19, 2004 (JP) ........................... P2004-123465
Feb. 7, 2005 (JP) ........................... P2005-030906

(51) Int. Cl.
*H04M 1/00* (2006.01)

(52) U.S. Cl. ............................... 455/569.1; 455/575.1; 455/575.5; 343/702; 343/718

(58) Field of Classification Search ................ 455/403, 455/414.1, 550.1, 554.2, 569.1, 575.1, 575.5, 455/575.7; 343/718, 702, 90.6, 906; 379/21, 379/22, 26
See application file for complete search history.

(56) References Cited

U.S. PATENT DOCUMENTS 3,720,874 A 3/1973 Gorcik et al.
4,369,521 A 1/1983 Sawada
5,361,405 A 11/1994 Ramsey
5,487,182 A 1/1996 Hansson
5,574,769 A * 11/1996 Clement ...................... 379/21
6,845,253 B1 * 1/2005 Schantz ................... 455/575.7

(Continued)

FOREIGN PATENT DOCUMENTS

GB 2 382 722 A 6/2003

(Continued)

*Primary Examiner*—Tony T. Nguyen
(74) *Attorney, Agent, or Firm*—Lerner, David, Littenberg, Krumholz & Mentlik, LLP

(57) ABSTRACT

An earphone antenna includes an earphone cable having first signal lines; a shielded cable including a coaxial cable, a second signal line for audio signals and a grounding wire, the coaxial cable having a central conductor passing high frequency signals surrounded by an insulator and further surrounded by a first shield wire, the coaxial cable, the second signal line, and the grounding wire collectively being surrounded by a second shield wire; a multipin connector arranged on one end of the shielded cable an adapted to electrically connect the shielded cable to a radio apparatus; and a connection block interconnecting the other end of the shielded cable and the earphone cable. The connection block includes a balun for carrying out impedance and balanced/unbalanced mode transformation, and an audio signal transmission path formed by connecting the second signal line and the grounding wire, respectively, to the pair of first signal lines via a high frequency choke exhibiting low impedance for audio signals and high impedance for high frequency signals. By connecting the central conductor of the coaxial cable and the first shield wire to an unbalanced part of the balun, connecting the pair of first signal lines to one end of a balanced part of the balun via a capacitor exhibiting high impedance for audio signals and low impedance for high frequency signals, and connecting the other end of the balanced part of the balun to the second shield wire, a dipole antenna is formed by the earphone cable and the second shield wire.

5 Claims, 7 Drawing Sheets

U.S. PATENT DOCUMENTS

| | | | | |
|---|---|---|---|---|
| 7,236,137 | B2 * | 6/2007 | Yoshino et al. | 343/718 |
| 2004/0138723 | A1 * | 7/2004 | Malick et al. | 607/57 |

FOREIGN PATENT DOCUMENTS

| | | | |
|---|---|---|---|
| GB | 2 393 858 | A | 4/2004 |
| JP | 48-002637 | | 1/1973 |
| JP | 49-056844 | | 6/1974 |
| JP | 52-077636 | | 6/1977 |
| JP | 59-108348 | | 6/1984 |
| JP | 59-132475 | A | 7/1984 |
| JP | 61-035412 | | 2/1986 |
| JP | 63-070742 | | 3/1988 |
| JP | 03-109414 | | 5/1991 |
| JP | 04-056530 | A | 2/1992 |
| JP | 06-088015 | | 3/1994 |
| JP | 08-065026 | | 3/1996 |
| JP | 09-199237 | A | 7/1997 |
| JP | 09-331209 | | 12/1997 |
| JP | 2003-163529 | A | 6/2003 |
| JP | 2005-136587 | | 5/2005 |
| WO | WO-03/026342 | A2 | 3/2003 |

* cited by examiner

EARPHONE ANTENNA AND PORTABLE RADIO EQUIPMENT PROVIDED WITH EARPHONE ANTENNA

CROSS-REFERENCE TO RELATED APPLICATIONS

The present application claims priority from Japanese Patent Application Nos. JP2004-123465 filed on Apr. 19, 2004 and JP2005-030906 filed on Feb. 7, 2005, the disclosures of both of which are hereby incorporated by reference herein.

BACKGROUND OF THE INVENTION

The present invention relates to an earphone antenna for portable radio equipment which is put on a human body during use, and portable radio equipment provided with this earphone antenna.

Conventionally, in portable radio equipment, such as a pager, radio receiver, LCD television receiver and the like, which are used by putting on a human body, a rod antenna or an earphone antenna which utilizes a signal wire for transmitting audio signals to earphones is used as an antenna. Such arrangement is disclosed, for example, in JP-A Laid-Open No 2003-163529.

In the portable radio equipment which uses a rod antenna or an earphone antenna at the time of use on a human body, there has been a problem that because of a significant deterioration of antenna performance when put on the human body, such as in television broadcasts where signals with a large amount of information, e.g., video signals, are processed, a sufficient reception sensitivity cannot be obtained.

In particular, the earphone antenna which utilizes the signal wire for transmitting audio signals to the earphones as an antenna has had a problem that because the earphones and/or the signal wire make direct contact with the human body, the human body has caused a significant influence on the radio equipment via the antenna to greatly deteriorate the stability of reception.

Further, for example, in television broadcasts in Japan, VHF bands from 90 to 108 MHz (1-3 channels), and from 170 to 222 MHz (4-12 channels), and the UHF band from 470 to 770 MHz (13-62 channels) are used. Therefore, a liquid crystal television receiver for receiving television broadcasts is required to receive high frequency signals in an extremely wide band range from 90 to 770 MHz. Accordingly, with a conventional rod antenna or earphone antenna the performance of which is inferior to a fixed-type antenna, it has been extremely difficult to secure a sufficient sensitivity in the required frequency band range.

Still further, because the rod antenna and the earphone antenna are monopole antennas which resonate at $\lambda/4$, their reception sensitivity is greatly affected depending on the ground size of the portable radio terminal, thereby limiting the design of the portable radio equipment.

SUMMARY OF THE INVENTION

The present invention is contemplated to solve the aforementioned shortcomings associated with the conventional art. It is thus desirable to provide an earphone antenna which is capable of reducing the adverse effects from the human body and achieving a high gain in a wide band range, and also to provide portable radio equipment which exhibits reception stability.

An earphone antenna according to an embodiment of the present invention includes an earphone cable including a pair of insulation-coated first signal lines for supplying audio signals to an earphone; a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire; a multipin connector arranged on one end of the shielded cable and adapted to electronically connect the shielded cable to a radio apparatus; and a connection block interconnecting the other end of the shielded cable and the earphone cable, the connection block including a balun for carrying out impedance and balanced/unbalanced mode transformation, and an audio signal transmission path formed by connecting the second signal line for audio signals and the grounding wire, respectively, to the pair of first signal lines via a high frequency choke which exhibits low impedance in a frequency range of audio signals and high impedance in a frequency range of high frequency signals. Connecting the central conductor of the coaxial cable and the first shield wire to an unbalanced part of the balun, connecting the pair of first signal lines to one end of a balanced part of the balun via a capacitor which exhibits high impedance in the frequency range of audio signals and low impedance in the frequency range of high frequency signals, and connecting the other end of the balanced part of the balun to the second shield wire causes formation of a dipole antenna by the earphone cable and the second shield wire.

Further, a portable radio apparatus according to another embodiment of the present invention includes a main body having a tuner, an audio signal output unit, and a multipin jack connected to the tuner and to the audio signal output unit; and an earphone antenna including an earphone cable having a pair of insulation-coated first signal lines for supplying audio signals to an earphone; a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire; a multipin connector arranged on one end of the shielded cable and adapted for electrical connection to the multipin jack; and a connection block interconnecting the other end of the shielded cable and the earphone cable, the connection block including a balun for carrying out impedance and balanced/unbalanced mode transformation, and an audio signal transmission path formed by connecting the second signal line for audio signals and the grounding wire, respectively, to the pair of first signal lines via a high frequency choke which exhibits low impedance in a frequency range of audio signals and high impedance in a frequency range of high frequency signals. Connecting the central conductor of the coaxial cable and the first shield wire to an unbalanced part of the balun, connecting the pair of first signal lines to one end of a balanced part of the balun via a capacitor which exhibits high impedance in the frequency range of audio signals and low impedance in the frequency range of high frequency signals, and connecting the other end of the balanced part of the balun to the second shield wire causes formation of a dipole antenna by the earphone cable and the second shield wire.

According to an embodiment of the earphone antenna of the present invention, in the connection block, by connecting the second signal line for audio signals and the grounding wire to the pair of first signal lines via the high frequency choke which exhibits low impedance in the frequency range of audio signals and high impedance in the frequency range of high frequency signals, the transmission path for audio signals is formed. Also, by connecting the central conductor of the coaxial cable and the first shield wire to the unbalanced part of the balun which carries out impedance and balanced/unbalanced mode transformation, connecting the pair of first signal lines to one end of the balanced part of the balun via the capacitor which exhibits high impedance in the frequency range of audio signals and low impedance in the frequency range of high frequency signals, and connecting the other end of the balanced part of the balun to the second shield wire, the earphone cable and the second shield wire are caused to function together as the dipole antenna. As a result, the influence of the human body is reduced and a high gain over a wide range of frequency bands is obtained.

An earphone antenna according to an embodiment of the present invention may further include a second earphone cable including a second pair of insulation-coated first signal lines for supplying audio signals to an earphone, the connection block interconnecting the other end of the shielded cable and the second earphone cable, the connection block further including another audio signal transmission path formed by connecting the second signal line for audio signals and the grounding wire, respectively, to the second pair of first signal lines via a high frequency choke which exhibits low impedance in the frequency range of audio signals and high impedance in the frequency range of high frequency signals. Connecting the central conductor of the coaxial cable and the first shield wire to the unbalanced part of the balun, connecting the second pair of first signal lines to the one end of the balanced part of the balun via the capacitor, and connecting the other end of the balanced part of the balun to the second shield wire causes formation of a dipole antenna by the second earphone cable and the second shield wire. The earphone antenna further includes a first stereophonic earphone connected to the connection block via the first earphone cable; a second stereophonic earphone connected to the connection block via the second earphone cable; and a high frequency choke inserted in an en-route portion of at least one of the first and second earphone cables so as to create a resonance frequency in the first earphone cable which is different from the resonance frequency in the second earphone cable.

Further, the earphone antenna according to an embodiment of the present invention may include a microphone and a switch mounted on the connection block.

Still further, the earphone antenna according to an embodiment of the present invention may include an amplifier mounted on the connection block.

In the portable radio apparatus according to one embodiment of the present invention, in the connection block, by connecting the second signal line for audio signals and the grounding wire to the pair of first signal lines via the high frequency choke which exhibits low impedance in the frequency range of audio signals and high impedance in the frequency range of high frequency signals, the transmission path for the audio signals is formed. Also, by connecting the central conductor of the coaxial cable and the first shield wire to the unbalanced part of the balun which carries out the impedance and balanced/unbalanced mode transformation, connecting the pair of first signal lines to one end of the balanced part of the balun via the capacitor which exhibits high impedance in the frequency range of radio signals and low impedance in the frequency range of high frequency signals, and connecting the other end of the balanced part of the balun to the second shield wire, the earphone cable and the second wire are caused to function together as the dipole antenna which is connectable to the main body of the radio apparatus via the multipin jack, thereby obtaining reception stability over a wide range of frequency bands.

Further features of the invention, and the advantages offered thereby, are explained in detail hereinafter with reference to specific embodiments of the invention illustrated in the accompanying drawings.

DETAILED DESCRIPTION

Figure 1:
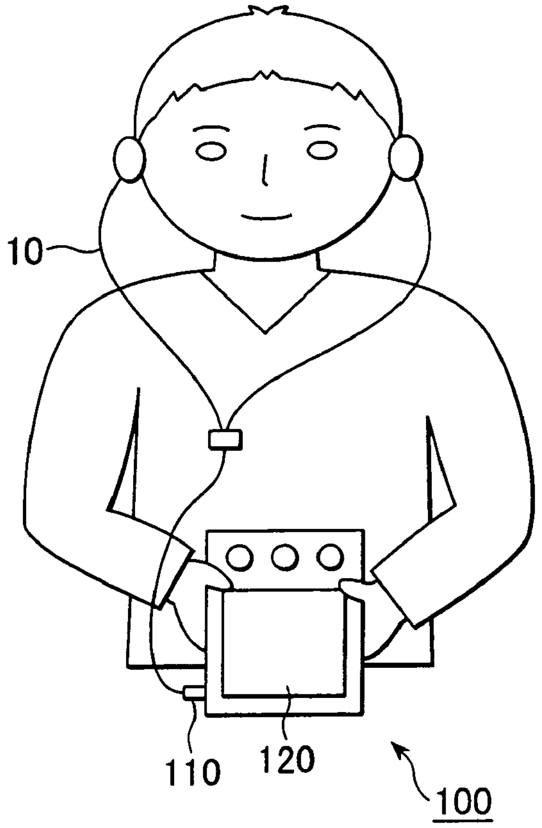
FIG. 1 is a block diagram showing the configuration of an LCD television receiver according to the present invention.

The present invention is applicable to, for example, an LCD television receiver 100 shown in FIG. 1. In the LCD television receiver 100, an earphone antenna 10 according to an embodiment of the present invention is connected to the main body of the receiver 120 via a pin jack connector 110.

Figure 2:
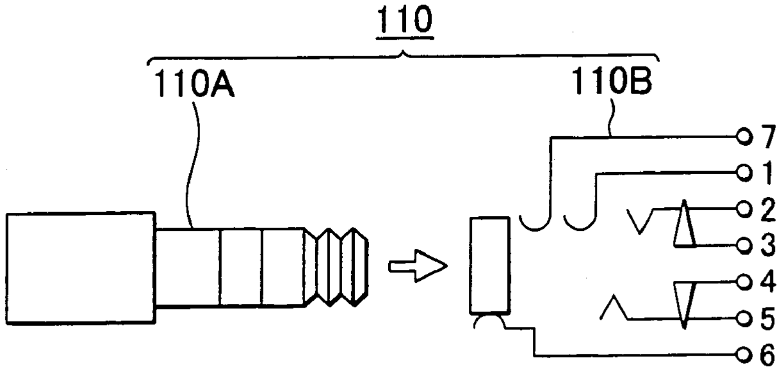
FIG. 2 is a diagram showing the configuration of a pin-jack connector for connecting between the main body of the receiver and an earphone antenna in the LCD television receiver.

The pin jack connector 110, as shown in FIG. 2, is composed of a five electrode pin 110A and a jack 110B to which five kinds of lines, including antenna (Ant), headphone detection (detect), audio L channel (L), audio R channel (R), and ground (Gnd) are connected, respectively.

Figure 3:
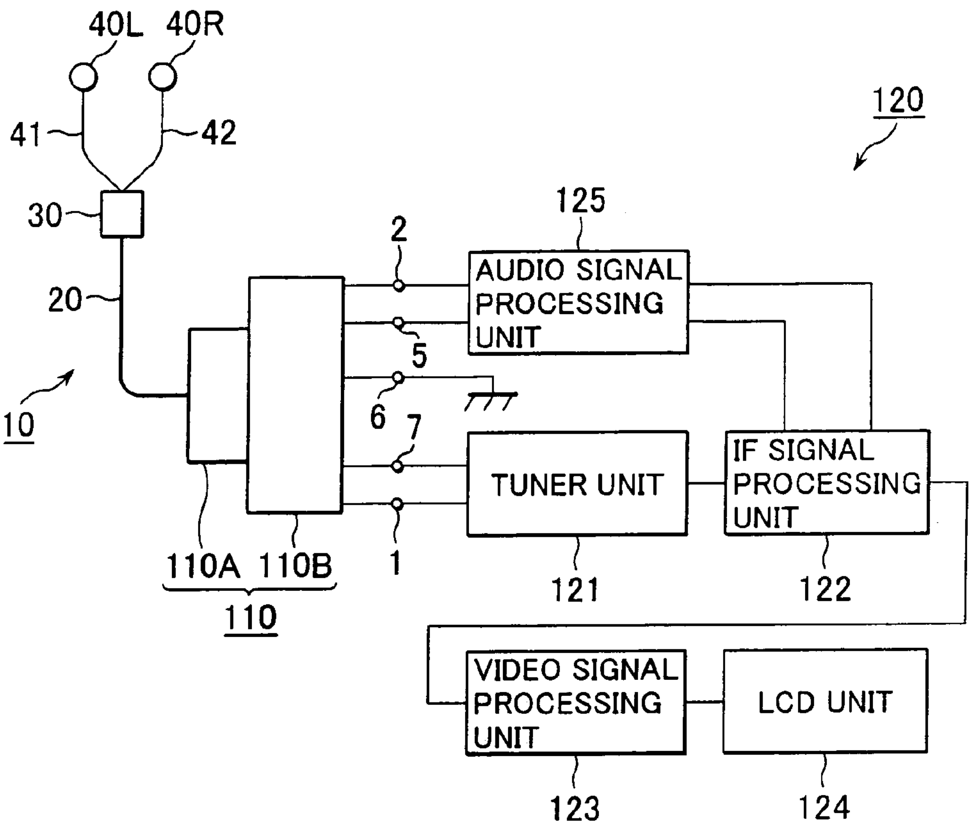
FIG. 3 is a block diagram showing the configuration of the main body of the receiver.

In the main body of the receiver 120, as shown in FIG. 3, there are provided a tuner unit 121, an IF signal processing unit 122 connected to the tuner unit 121, a video signal processing unit 123 and an audio signal processing unit 125 both connected to the IF signal processing unit 122, a liquid crystal display unit 124 connected to the video signal processing unit 123, and the jack 110B of the pin jack connector 110 described above.

In the LCD television receiver 100, the jack 110B described above has five movable terminals 1, 2, 5, 6, 7 and two fixed terminals 3, 4 as shown in FIG. 2, where, as shown in FIG. 3, the movable terminal 7 is connected as an antenna terminal (Ant) and the movable terminal 1 as ground to the tuner unit 121. Further, movable terminals 2, 5 are connected to the audio signal processing unit 125 as an audio L channel terminal (L) and an audio R channel terminal (R). The movable terminal 6 is connected to GND of a substrate in the main body of the radio apparatus as a common ground terminal (Gnd) of the radio apparatus. The fixed terminals 3, 4 are for firmly securing the pins.

The earphone antenna 10 is composed of a shielded cable 20, one end of which is connected to the receiver's main body 120 via the five pin jack connector 110, a connection block 30 which is connected to the other end of the shielded cable 20, and stereophonic earphones 40L, 40R which are connected to the connection block 30 via respective earphone cables 41, 42.

Figure 4:
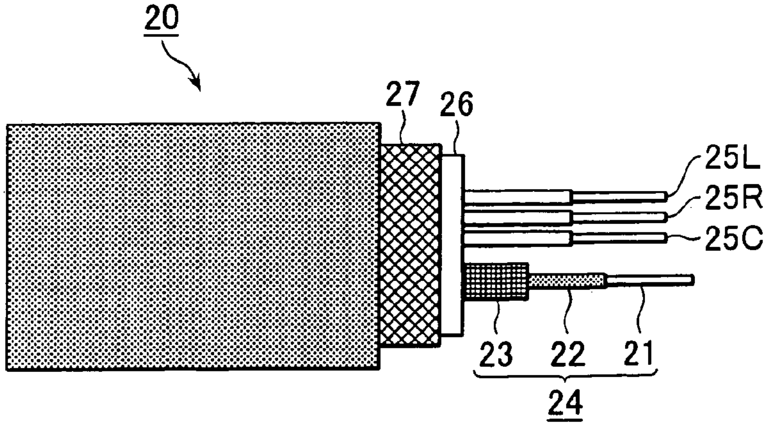
FIG. 4 is a diagram showing the configuration of a shielded cable which forms part of the earphone antenna.

The shielded cable 20 is composed of, as shown in FIG. 4, a coaxial cable 24 having a central conductor 21 which passes high frequency signals, coated with an insulator 22 which is further covered with a shield wire 23; signal lines 25L, 25R for audio signals which are insulation-coated; and a grounding wire 25C. The exterior of these wires/cables is surrounded by an insulation layer 26 made of paper or vinyl sheet which, in turn, is surrounded by a shield wire 27 having a wound soft copper structure or alternatively a braided structure.

One end of the shielded cable 20 is provided with a five electrode pin 110A which is connected to the central conductor 21 and the shield wire 23 of the coaxial cable 24, signal lines 25L, 25R for audio signals, and the grounding wire 25C. Further, the connection block 30 is provided at the other end of the shielded cable 20. The connection block 30 is connected to the central conductor 21 and the shield wire 23 of the coaxial cable 24, the signal lines 25L, 25R for audio signals, the grounding wire 25C and the shield wire 27. It will be noted that the shield wire 27 which surrounds the coaxial cable 24, audio signal lines 25L, 25R and the grounding 3ire 25C is connected to the connection block 30, but is not connected to the pin 110A.

Figure 5:
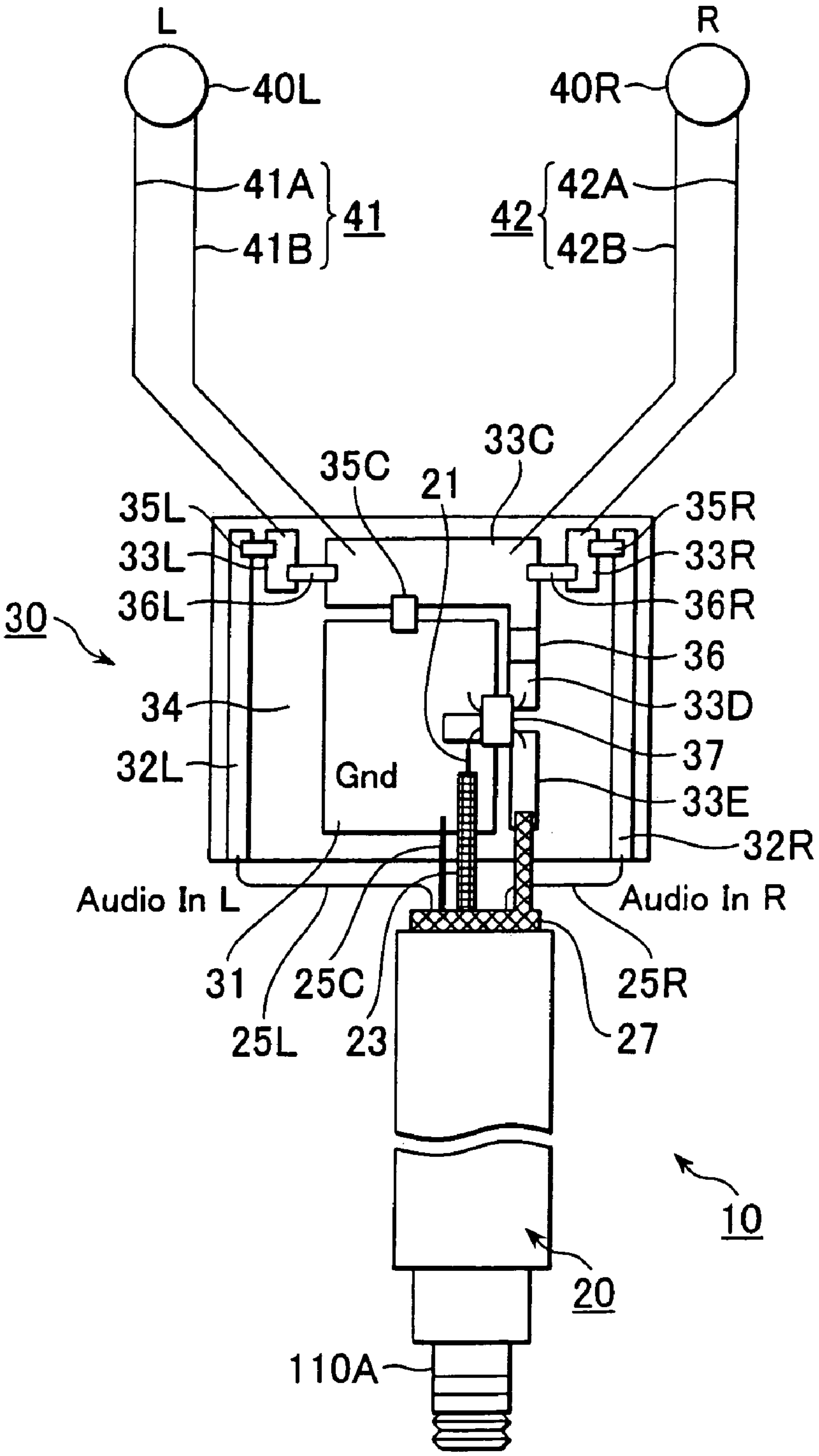
FIG. 5 is a diagram showing the configuration of a connection block which forms part of the earphone antenna.

As shown in FIG. 5, the connection block 30 has a substrate 34 on which are formed a ground pattern 31 in the center thereof, transmission line patterns 32L, 32R for stereophonic audio signals which are positioned on both sides of the ground pattern 31, three connection lands 33L, 33R and 33C positioned on upper edge portions toward the ground pattern 31, and fourth and fifth connection lands 33D, 33E positioned on one side of the ground pattern 31.

In the connection block 30, an edge portion of each transmission line pattern 32L, 32R for the stereophonic audio signals is connected via a high frequency choke 35L, 35R to the first and second connection lands 33L, 33R, respectively. Further, the ground pattern 31 is connected to the third connection land 33C via a high frequency choke 35C. Still further, the first connection land 33L and the third connection land 33C are connected via a chip capacitor 36L. The second connection land 33R and the third connection land 33C are connected via a chip capacitor 36R. Further, the third connection land 33C and the fourth connection land 33D are connected via a chip capacitor 36. In addition, a balun 37 for performing impedance and balanced/unbalanced mode transformation is mounted on the substrate and is connected to the fourth connection land 33D, the ground pattern 31 and the fifth connection land 33E. By way of example, the balun 37 may be configured such that one end of its balanced side is connected to the fourth connection land 33D, the other end of its balanced side is connected to the fifth connection land 33E, and one end of its unbalanced side is connected to the ground pattern 31.

Also in the connection block 30, a left side earphone cable 41 including two signal lines 41A, 41B for supplying left side audio signals to a left side earphone 40L is connected to the first connection land 33L and the third connection land 33C. Further, a right side earphone cable 42 including two signal lines 42A, 42B for supplying right side audio signals to a right side earphone 40R is connected to the second connection land 33R and the third connection land 33C.

The aforementioned shielded cable 20 is connected to the connection block 30 as follows.

The left side audio signal line 25L and the right side audio signal line 25R of the shielded cable 20 are connected to the transmission line patterns 32L and 32R for audio signals, respectively, formed on the substrate 34, and the grounding wire 25C thereof is connected to the ground pattern 31. Further, the central conductor 21 and the shield wire 23 which constitute the coaxial cable 24 are mounted on the ground pattern 31, the shield wire 23 thereof is connected to the ground pattern 31 and an end of the central conductor is connected to the other end of the unbalanced side of the balun 37. Still further, the shield wire 27 is connected to the fifth connection land 33E.

According to the preferred embodiment of the invention, as the aforementioned high frequency chokes 35L, 35R and 35C, ferrite beads, for example, BLM18HD102SN1, size 1608 produced by Murata Manufacturing Ltd., may be used. The high frequency chokes 35L, 35R and 35C which use these ferrite beads exhibit low impedance to audio signals in the frequency range below 20 kHz and high impedance to high frequency signals, thereby blocking the passage of high frequency signals. Further, as the chip capacitors 36L, 36R and 36C, capacitors having a capacitance of 10 pF are used, respectively, so as to exhibit high impedance to audio signals in the frequency range below 20 kHz in order to block the passage of such audio signals, and exhibit low impedance to high frequency signals.

Figure 6:
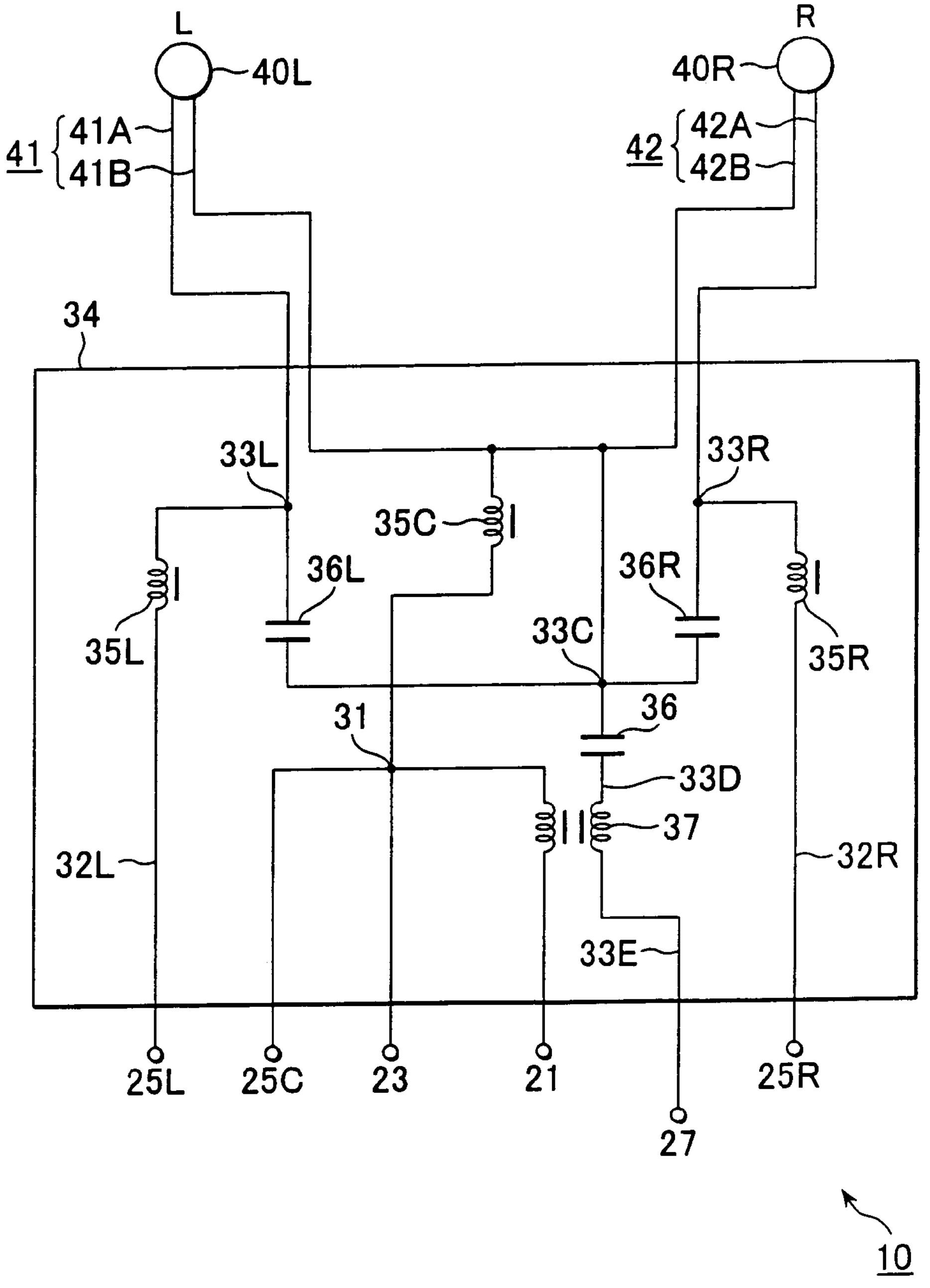
FIG. 6 is a circuit configuration diagram showing the electrical configuration of the earphone antenna.

Earphone antenna 10, as indicated in the circuitry configuration diagram shown in FIG. 6, leads out earphone cables 41, 42 each composed of two signal lines of the left side line 41A and GND 41B and of the right side line 42A and GND 42B, for transmitting audio signals to speakers 40L, 40R respectively, of a stereophonic earphone. Then, in order to separate the audio signals from high frequency signals, high frequency wave chokes 35L, 35R and 35C using ferrite beads are provided at an input portion of the audio signals and at a ground portion, i.e., at connection lands 33L, 33R and 33C, which exhibit high impedance (1 kΩ or greater) in the frequency range used in television broadcasts, and low impedance in the audio frequency range (less than 20 kHz), thereby separating the audio signals and the high frequency signals.

That is, because the earphone cables 41, 42, each including two signal lines 41A, 41B/42A, 42B on each side, are connected, in terms of high frequency, to the central conductor 21 which is a signal line of the coaxial cable 24, in order to separate the audio signals therefrom, they are configured to connect between the connection lands 33L, 33R, 33D and 33E via chip capacitors 36L, 36R and 36 of 10 pF, so as to separate out signals in the audio range and pass RF signals (frequency range of television bands).

The frequency bands allocated for use in television broadcasts in Japan are 90M to 108 MHz (1-3 channels) and 170M to 222 MHz (4-12 channels) in VHF, and 470M to 770 MHz (13-62 channels) in the UHF band.

Therefore, in the earphone antenna 10, by connecting the earphone cables 41, 42 and the shield wire 27 which surrounds the shielded cable 20 to the coaxial cable 24 via the balun 37, the earphone cables 41, 42 and the shield wire 27 are configured to be used as an aerial having a dipole antenna structure resonating at its line length, and each length thereof is adjusted to be able to receive 100 MHz in the VHF band.

In the earphone antenna 10 according to this embodiment of the invention, the characteristic impedance of the coaxial cable 24 is set at 75 Ω, the length of the shielded cable 20 at 70 cm, and the length of the earphone cables 41, 42 at 50 cm to adjust the antenna to resonate at 100 MHz. For 200 MHz, it is configured to be able to receive as a 1λ antenna. In UHF, it is configured to use harmonic oscillations of 100 MHz and 200 MHz (triple, quintuple, septuple waves).

The earphone antenna 10 according to the preferred embodiment of the invention, because of its dipole structure, is stabilized as an antenna, and various functions can be added to the connection block 30.

Figure 7:
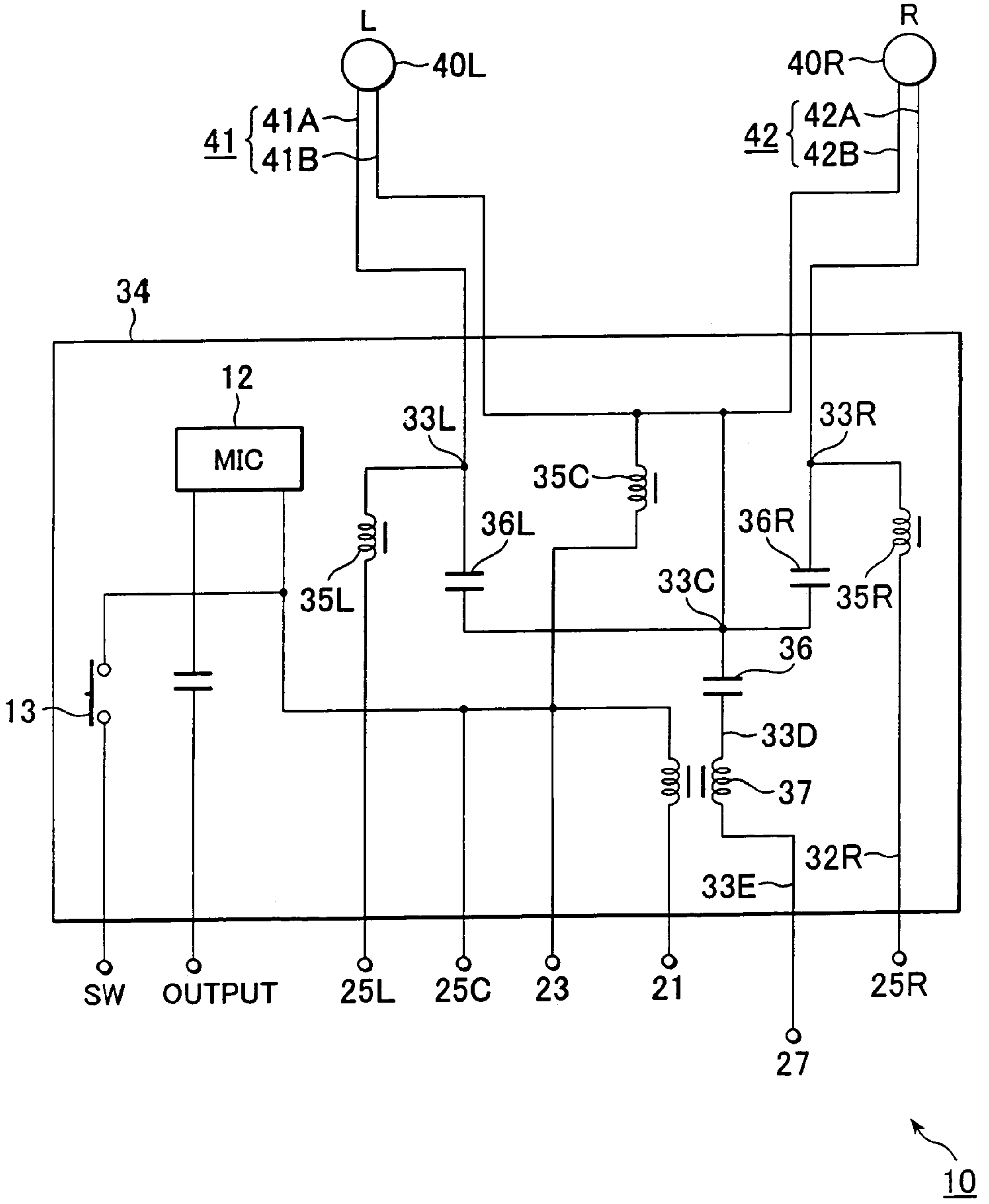
FIG. 7 is a circuit configuration diagram showing the electrical configuration of an earphone antenna which incorporates a microphone mounted in the connection block.
Figure 8:
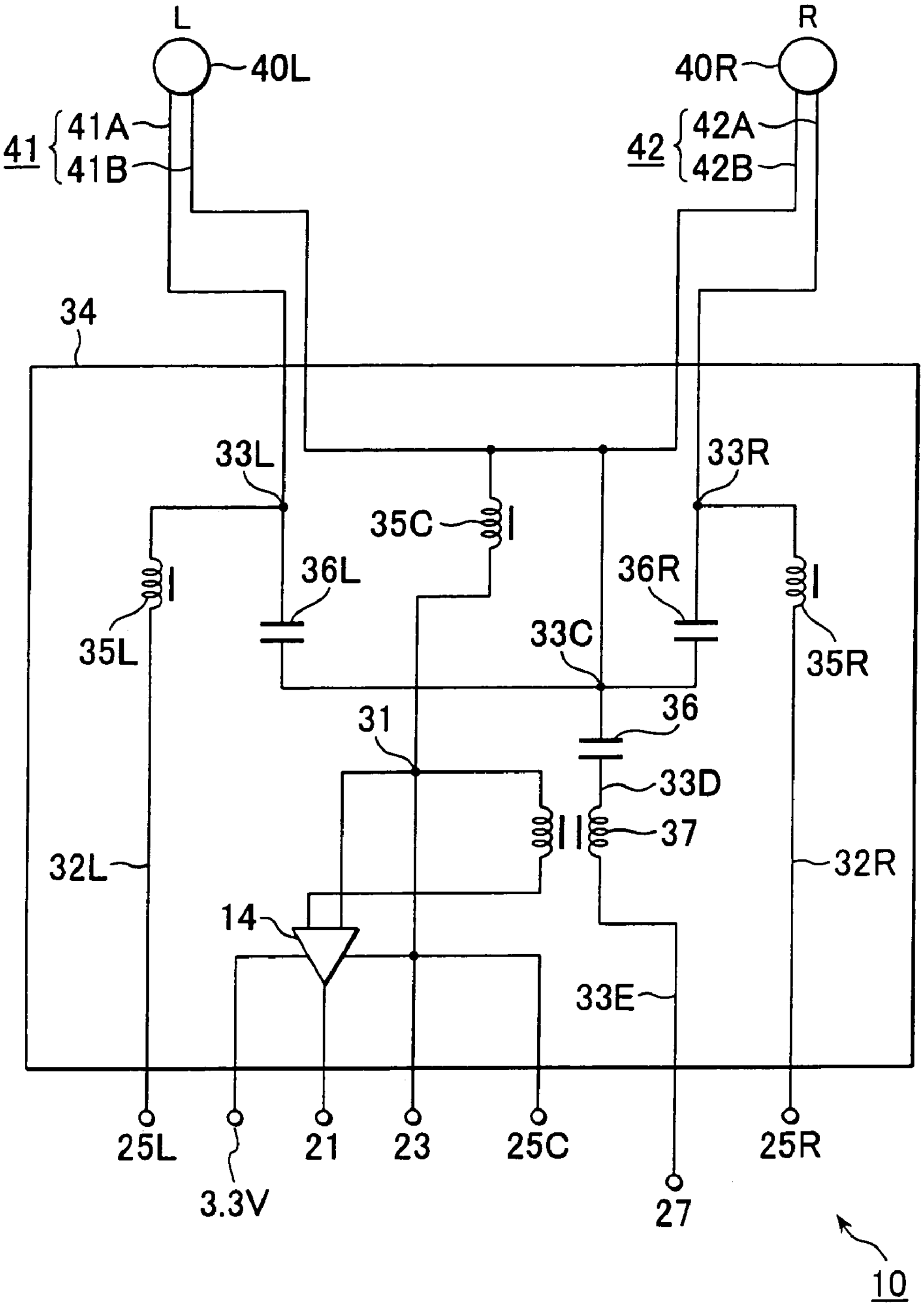
FIG. 8 is a circuit configuration diagram showing the electrical configuration of an earphone antenna which has an amplifier mounted in the connection block.

For example, for a portable telephone, by implementing a circuit configuration provided with a microphone 12 and a switch 13 as shown in FIG. 7, the function of the microphone 12 may be added without decreasing the antenna gain. Also, by adding an amplifier 14 in the manner shown in FIG. 8, the amplifier 14 may be placed in the vicinity of the antenna so as to achieve a significant improvement in NF (noise factor) as a system.

In the earphone antenna 10 described above, the lengths of the two earphone cables 41, 42 are set to be equal. However, it is also possible to vary the lengths of the two earphone cables 41, 42 from the connection lands 33L, 33R and 33C in the connection block 30 to the earphones 40L, 40R, in order to be able to correspond to different frequencies.

Figure 9:
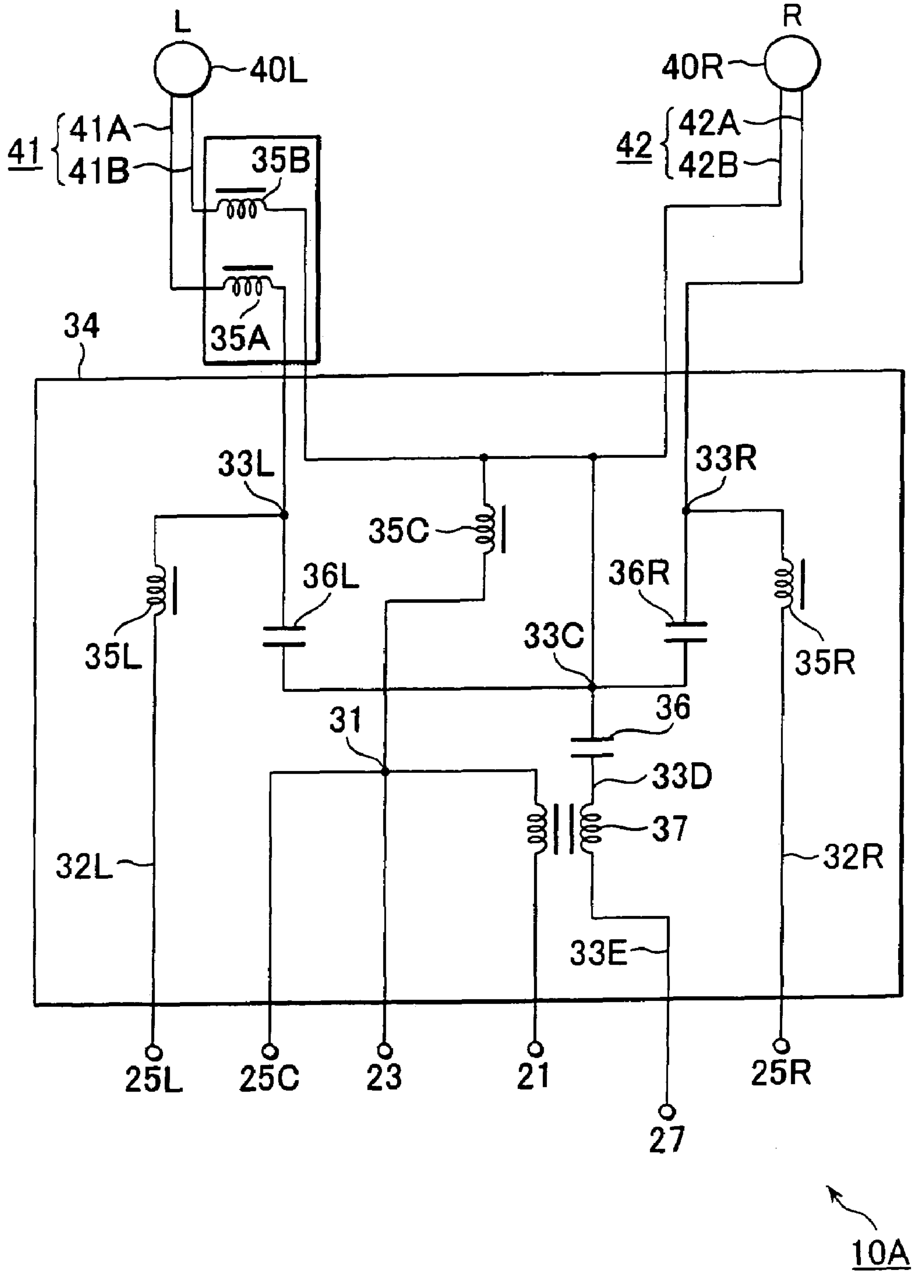
FIG. 9 is a circuit configuration diagram showing the configuration of another earphone antenna according to the present invention.

Alternatively, by inserting a high frequency choke (ferrite beads) 35A, 35B into an en-route portion of one of the two earphone cables 41, 42, for example, the earphone cable 41 for the left side audio signal as indicated in the earphone antenna 10A shown in FIG. 9, it may be configured to separate high frequency signals to shorten its resonance length. The earphone antenna 10A shown in FIG. 9 may be set such that the resonance length in one earphone antenna 41 is 250 mm, the resonance length in the other earphone antenna 42 is 400 mm, the characteristic impedance of the coaxial cable 24 is 75 Ω, and the length of the shielded cable 20 is 600 mm. By way of example, in the earphone antenna 10A, the other components are the same as in the aforementioned earphone antenna 10. Therefore, the same components are indicated by the same symbols and numerals in FIG. 9, making it possible to omit a detailed description thereof.

Further, the present invention is also applicable to the case of a monophonic earphone where a single earphone cable is used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An earphone antenna, comprising:

a first earphone cable including a pair of insulation-coated first signal lines for supplying audio signals to an earphone;

a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire;

a multipin connector arranged on one end of the shielded cable and adapted to electrically connect the shielded cable to a radio apparatus; and a connection block interconnecting the other end of the shielded cable and the first earphone cable, the connection block including a balun for carrying out impedance and balanced/unbalanced mode transformation, and an audio signal transmission path formed by connecting the second signal line for audio signals and the grounding wire, respectively, to the pair of first signal lines via a high frequency choke which exhibits low impedance in a frequency range of audio signals and high impedance in a frequency range of high frequency signals;

wherein connecting the central conductor of the coaxial cable and the first shield wire to an unbalanced part of the balun, connecting the pair of first signal lines to one end of a balanced part of the balun via a capacitor which exhibits high impedance in the frequency range of audio signals and low impedance in the frequency range of high frequency signals, and connecting the other end of the balanced part of the balun to the second shield wire causes formation of a dipole antenna by the first earphone cable and the second shield wire.

2. The earphone antenna according to claim 1, further comprising:

a second earphone cable including a second pair of insulation-coated first signal lines for supplying audio signals to an earphone;

the connection block interconnecting the other end of the shielded cable and the second earphone cable, the connection block further including another audio signal transmission path formed by connecting the second signal line for audio signals and the grounding wire, respectively, to the second pair of first signal lines via a high frequency choke which exhibits low impedance in the frequency range of audio signals and high impedance in the frequency range of high frequency signals, wherein connecting the central conductor of the coaxial cable and the first shield wire to the unbalanced part of the balun, connecting the second pair of first signal lines to the one end of the balanced part of the balun via the capacitor, and connecting the other end of the balanced part of the balun to the second shield wire causes formation of a dipole antenna by the second earphone cable and the second shield wire;

a first stereophonic earphone connected to the connection block via the first earphone cable;

a second stereophonic earphone connected to the connection block via the second earphone cable; and a high frequency choke inserted in an en-route portion of at least one of the first and second earphone cables so as to create a resonance frequency in the first earphone cable which is different from the resonance frequency in the second earphone cable.

3. An earphone antenna according to claim 1, further comprising a microphone and a switch mounted on the connection block.

4. An earphone antenna according to claim 1, further comprising an amplifier mounted on the connection block.

5. A portable radio apparatus, comprising:

a main body having a tuner, an audio signal output unit, and a multipin jack connected to the tuner and to the audio signal output unit; and an earphone antenna including an earphone cable having a pair of insulated-coated first signal lines for supplying audio signals to an earphone; a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire; a multipin connector arranged on one end of the shielded cable and adapted for electrical connection to the multipin jack; and a connection block interconnecting the other end of the shielded cable and the earphone cable, the connection block including a balun for carrying out impedance and balanced/unbalanced mode transformation, and an audio signal transmission path formed by connecting the second signal line for audio signals and the grounding wire, respectively, to the pair of first signal lines via a high frequency choke which exhibits low impedance in a frequency range of audio signals and high impedance in a frequency range of high frequency signals;

wherein connecting the central conductor of the coaxial cable and the first shield wire to an unbalanced part of the balun, connecting the pair of first signal lines to one end of a balanced part of the balun via a capacitor which exhibits high impedance in the frequency range of audio signals and low impedance in the frequency range of high frequency signals, and connecting the other end of the balanced part of the balun to the second shield wire causes formation of a dipole antenna by the earphone cable and the second shield wire.

* * * * *